US007555990B2

(12) United States Patent
Beaujot

(10) Patent No.: US 7,555,990 B2
(45) Date of Patent: Jul. 7, 2009

(54) AIR SEEDER/FERTILIZER APPARATUS HAVING METERING MEANS AND DISTRIBUTION MANIFOLD WITH SELECTIVELY OPENABLE PORTS

(75) Inventor: Patrick M. Beaujot, Langbank (CA)

(73) Assignee: One Pass Implements Inc. (CA)

( * ) Notice: Subject to any disclaimer, the term of this patent is extended or adjusted under 35 U.S.C. 154(b) by 0 days.

(21) Appl. No.: 12/143,778

(22) Filed: Jun. 21, 2008

(65) Prior Publication Data

US 2009/0078178 A1 Mar. 26, 2009

Related U.S. Application Data

(60) Provisional application No. 60/974,351, filed on Sep. 21, 2007.

(51) Int. Cl.

| | |
|---|---|
| ***A01C 7/00*** | (2006.01) |
| ***A01C 9/00*** | (2006.01) |
| ***A01C 23/00*** | (2006.01) |
| ***G06F 7/70*** | (2006.01) |
| ***G06F 19/00*** | (2006.01) |

(52) U.S. Cl. ....................... 111/123; 111/175; 111/187; 111/188; 111/200; 111/903; 111/921; 111/922

(58) Field of Classification Search ................. 111/922, 111/921, 903, 900, 200, 186–188, 175, 174, 111/170, 118–129; 701/50
See application file for complete search history.

(56) References Cited

U.S. PATENT DOCUMENTS

| | | | | |
|---|---|---|---|---|
| 3,784,100 A | * | 1/1974 | Kirschmann | 239/11 |
| 4,260,107 A | * | 4/1981 | Jackson | 239/74 |
| 5,394,812 A | * | 3/1995 | Dunning et al. | 111/127 |
| 5,605,105 A | * | 2/1997 | Clark et al. | 111/127 |

* cited by examiner

*Primary Examiner*—Christopher J. Novosad
(74) *Attorney, Agent, or Firm*—Locke Lord Bissell & Liddell LLP

(57) ABSTRACT

A seeding apparatus having a distribution manifold with selectively openable outlet ports thereon, to permit or stop delivery of seed or fertilizer to soil A meter device, responsive to both the number of selected open ports and the speed of the apparatus over the ground, is provided to regulate supply of seed/fertilizer to a distribution manifold. The distribution manifold has a plurality of outlet ports spaced about a periphery of such manifold, each outlet port having a valve to allow opening and closing of individual outlet ports. Soil engaging members on such apparatus are individually raisable from an lowered operative position to a raised inoperative position, and when moved to such inoperative position, valve associated with an outlet port for providing seed and/or fertilizer to such soil engaging member is closed to prevent supply to the associated soil engaging member.

19 Claims, 6 Drawing Sheets

AIR SEEDER/FERTILIZER APPARATUS HAVING METERING MEANS AND DISTRIBUTION MANIFOLD WITH SELECTIVELY OPENABLE PORTS

FIELD OF THE INVENTION

The present invention relates to an air seeder or fertilizer apparatus for metered seeding or fertilizing, and meter controls for dispensing such seed or fertilizer.

BACKGROUND OF THE INVENTION

Air seeder and/or fertilizer apparatus are commonly used in agricultural operations to apply particulate materials including one or more of the following, namely seed, fertilizer and/or inoculants, into soil during the planting operation.

Prior art seeder/fertilizer devices often include a "tool bar" having ground-engaging openers thereon, behind which is towed a wheeled cart that includes one or more containment tanks or bins and associated metering means to respectively contain and meter therefrom particulate materials. One such device is the Seed Hawk™[1] device manufactured by Seed Hawk Inc. under license from the assignee of the within application.

[1] Trademark of one Pass Implements, for air seeder/fertilizer devices, used under license from One-Pass Implements Inc.

The metered particulate material from the metering means is delivered to the soil via pneumatic tubing which connect the metering means, via an intermediary primary distribution hub, to ground-engaging openers which engage soil and permit delivery of particulate material such as seed or fertilizer to furrows which are created in such soil by the ground-engaging openers.

An further example of such a system is shown in FIG. 1 of Canadian patent CA 2,111,611, where an air seeder cart 1 having a fertilizer bin 2*a* and a seed bin 2*b*, is towed behind a tool bar (shown in FIG. 1, but not numbered) having a plurality of knives 15 thereon for engaging the soil, wherein particulate material (seed or fertilizer) is conveyed from bins 2*a*, 2*b* via primary conveyance tube 3 to a primary distribution manifold 8 mounted on the tool bar, and from distribution manifold 8 is distributed to a plurality of manifold tubes 9, and then into secondary distribution tubes for delivery to each knife opener 15.

Typically a metering means for metering seed or fertilizer as the air seeder apparatus travels along the ground provided, and is located on an underside of each containment bin which forms part of a wheeled cart which is towed behind a tool bar having ground engaging openers. Where a plurality containment bins are used and a corresponding plurality of metering means are used, each metering means may typically be adjusted to deliver respective particulate material at a different rate than the other metering means. This is particularly of use where, for example, two types of particulate material are being injected into the soil, such as seed and fertilizer, each with different desired delivery rate.

Conventional metering devices for air seeder carts exist. Such metering devices are typically provided with rotatable rollers, rotatable augers, or rotatable dispensing wheels, which are operatively connected to a drive wheel in contact with the ground over which the wheeled cart travels or may be powered by electric or hydraulically powered motors.

FIG. 1 of Canadian patent CA 2,311,698 shows an air seeder cart 3, having a ground drive for rotating the metering devices 1,2 in proportion to a speed of travel of the air-seeder cart 3 along the ground. As best seen in FIG. 1 of CA 2,311, 698, the ground drive comprises a wheel sprocket on cart wheel 5 which drives primary chain 6 which in turn rotates metering devices 1, 2 to permit metered delivery of the seed.

Historically, farm sizes have increased and likewise field sizes have increased As such, the necessary seeding/fertilizing equipment has become larger, in some cases over 82 feet (over 25 meters). However, use of larger equipment can prove to be difficult and awkward when attempting to uniformly seed and/or fertilize irregularly-shaped tracts of land. In this regard, when using large equipment, to ensure seeding/fertilizing of all areas, the land irregularities often cause a significant overlap in certain areas of a tract of land being seeded and/or fertilized, which is necessary if large (wide) equipment is used.

Where overseeding/fertilizing occurs, the cost expended on seed and/or fertilizer is in excess of what is necessary for proper seeding and fertilizing. Additionally, over-fertilization and/or over-seeding of an area causes the crop to lodge and not ripen at the appropriate time causing harvest problems and losses in yield. The accumulative effect of over-seeding and over-fertilizing by overlapping, or alternatively the equally detrimental result of otherwise missing seeding and fertilizing certain small sections over many fields, can become a very significant expense to a farmer.

Prior art implements typically employ a metering device for metering the particulate material such as seed, than can apply a specific quantity of (particulate material (eg. seed) per linear distance travelled by the implement. However, the prior art implements have not resolved the problem that double seeding/fertilizing can occur with large implements when the land seeded is too narrow or odd shaped for the seeding device. Further, the prior art has not resolved the problem that even though the meter has been turned off, ground-engaging openers are still engaging the ground and destroying the seed bed. This causes the seeded area which is overlapped to be destroyed by the ground-engaging openers resulting in uneven germination causing further problems with a poor crop and an uneven harvest in these areas.

Canadian Patent Application 2,622,428 and U.S. Ser. No. 12/037,732 filed Feb. 22 and 26, 2008 respectively (both of which are commonly assigned like this application to One-Pass Implements Inc. of Langbank, Saskatchewan-owner of the SEED HAWK™ trademark), each of which being incorporated herein in their entirety, provided a solution to the above problem of overseeding, namely by providing a sectional meter shut-off apparatus capable of restricting flow to selected ground-engaging members of an agricultural implement used in dispensing material such as seed and/or fertilizer to soil, and further providing ability to raise ground-engaging openers for which particulate material supply had been shut off so avoid not only overseeding, but also avoid destruction of any already-seeded seed bed.

Specifically, in one broad aspect of that invention, a metering device was provided having a plurality of gates that can be individually engaged to block off specific portions of a metering roller which receive particulate material, and thus only specific portions of the field will be seeded or fertilized. The plurality of gates are controlled by electric actuators, hydraulic actuators, electric-over-hydraulic actuators and/or by a camshaft. To control the individual gates on each metering device a switch is operatively connected to the cab of the vehicle towing the seeding device, and means receptive to such switch are provided to allow opening or closing of the various gates of the meter device. From the cab the driver can specifically select which gates should remain open and which gates should be closed. Alternatively, the gates may be individually automatically opened or closed by instructions from a GPS system which has determined which areas of the field which regulated by the various gates of the meter apparatus are overlapping with prior seeded/fertilized soil.

Such invention further disclosed an agricultural implement capable of dual material disbursement, further having means to raise ground-engaging openers thereon to prevent ground engagement, in combination with a metering device as described above that is able to prevent flow to the inactivated (ice. raised) ground-engaging members when other ground-engaging members are operating.

Again, the sectional meter shut-off device in the above agricultural implement comprised meter gates each moveable between an open and closed position relative to the metering roller of the metering device such that when each of said gates is in said closed position the particulate material is not able to access the metering roller. Specifically, the meter gates of such metering device operated so as to simply "cut off" flow of particulate material to the metering device.

It is possible, however, to design an agricultural implement where the metering device does not contain any metering gates, and instead the metering device whether it be a metering roller or dispensing wheel is always given access to particulate material and the flow "cut-off" to selected ground-engaging members is located downstream of the metering device.

Such a design is the subject matter of the within invention, as set out and described below.

SUMMARY OF THE INVENTION

The present invention proposes a different manner of accomplishing the objective accomplished by the agricultural implement and sectional meter shut-off apparatus described in Canadian Patent Application 2,622,428 and U.S. Ser. No. 12/037,732.

Specifically, the present invention provides for an agricultural implement having a metering device, where the metering device does not contain any metering gates and the metering device whether it be a metering roller or dispensing wheel is continually given access to particulate material. Instead, the rate of metering is made proportional to the number of valves which may be open at a particular time on a downstream distributor manifold. The flow "cut-off" to selected ground-engaging members of the agricultural implement (which may be raised to avoid re-seeding or re-fertilizing areas of ground already seeded or fertilized, and to avoid disturbing the seed bed) is accomplished by a downstream distributor manifold which receives metered flow of particulate material at a metered rate and has a number of outlet ports to deliver metered particulate matter to soil engaging members to permit injection of such particulate material in the soil. A plurality of valve members are provided on each outlet port on the distributor manifold to allow selected opening or closing of each individual outlet port.

The metering means delivers particulate material proportional to the rate of travel of the agricultural implement over the ground, and proportional to the number of valves on the distributor manifold which may be open at a given time.

Accordingly, in a broad aspect of the present invention, the present invention comprises an agricultural implement for infecting at least one type of particulate material such as seed or fertilizer into soil, adapted to travel over an area of ground having both seeded portions which have had said particulate material injected therein and unseeded portions of ground which have not had said particulate material injected therein, and to inject said particulate material only into said unseeded portions of ground, comprising;

a plurality of soil-engaging members and associated raising means, each raising means when actuated adapted to raise an associated soil-engaging member from a lowered operating position where said soil-engaging member engages soil to a raised inoperative position;

a plurality of material-dispensing means for receiving said particulate material and dispensing said particulate material into furrows created by said soil-engaging members;

a metering means for dispensing said particulate material at a metered rate;

a distribution manifold, having:

(i) an inlet port for receiving metered particulate material from said metering means;

(ii) a plurality of outlet ports, and (iii) valve means on each of said plurality of outlet ports to permit selected opening and closing of said plurality of outlet ports;

wherein the metering means dispenses the particulate material to the distribution manifold at a metered rate proportional to a rate of travel of said implement over the ground.

In a further refinement, the metering rate is not only proportional to a rate of travel of said implement over the ground, but is also inversely proportional to a number of outlet ports on said distribution manifold which have been selectively closed.

The agricultural implement of the present invention, in a further preferred embodiment, comprises:

navigation means, typically in the form of satellite navigation means for accessing GPS, GNSS, or Galilleo satellite positioning systems, for providing precise geographic position of said agricultural implement at given points in time;

memory means for keeping a record of said precise geographic position over time as said agricultural implement travels over the ground; and determination and actuation means for determining whether portions of said agricultural apparatus have previously travelled over ground over which said agricultural implement may then be travelling, and if determining such to be the case, further adapted to actuate selected of said raising means and associated soil-engaging means which otherwise would engage soil in ground over which said agricultural implement had previously travelled so as to cause said selected soil-engaging members to become raised from said ground, thereby preventing areas of ground in which particulate material has already been injected from being farther re-injected with particulate material.

Alternatively, or in addition, in a further preferred embodiment of the invention the determination and actuation means is adapted to actuate selected of said valve means on said distribution manifold to cause said selected valve means to close to thereby prevent delivery of said particulate material from said metering means to said selected material-dispensing means, thereby preventing areas of ground in which particulate material has already been injected from being further injected with additional particulate material.

In a further preferred embodiment, the metering means is operatively coupled to a speed-sensing means which senses the speed of the implement over the ground. In this regard, the speed-sensing means may be the indirect electrical output obtained from an electric generator connected to a ground drive, the hydraulic output from a hydraulic motor connected to a ground drive, or still alternatively determined via a direct chain drive from a geared sprocket on an axle of one of the tires/wheels of the device, so that said metering means dispenses said particulate material at a metered rate proportional to the speed at which said ground-following member travels over the ground. Alternatively, the speed-sensing means may be derived from satellite navigation, determined by a GPS satellite navigation system over a time interval, as commonly now used in the satellite navigation devices.

In yet a further preferred embodiment, the metering means comprises a metering roller, fluted auger, or distribution wheel, which is operatively turned by an electric motor, a hydraulic motor, or a direct chain drive, wherein the speed of the roller, helical fluted auger, or metering wheel is directly proportional to the speed of travel of the agricultural implement over the ground.

In a further embodiment of the distribution manifold of the present invention, the valve means associated with each outlet port on the distribution manifold may be further adapted, when actuated so as to close the associated outlet port so as to prevent supply of seed/fertilizer to one or more material dispensing means, to simultaneously open a return port on the distribution manifold, to redirect the supply of metered particulate material corresponding to such outlet port back to the seed or fertilizer supply bin, for later usage. Specifically, in a further embodiment of the distribution manifold of the present invention, at each of the outlet ports there are provided return ports, and the valve means are further adapted, when actuated to close a selected outlet port, to simultaneously open an associated return port, to permit return of particulate material to a supply bin via said return port.

Preferred features of the invention are depicted in the following descriptions of illustrative embodiments.

BRIEF DESCRIPTION OF THE DRAWINGS

The following illustrative and non-limited examples of the invention are shown in the attached figures, in which.

DETAILED DESCRIPTION OF THE EMBODIMENTS

Figure 1:
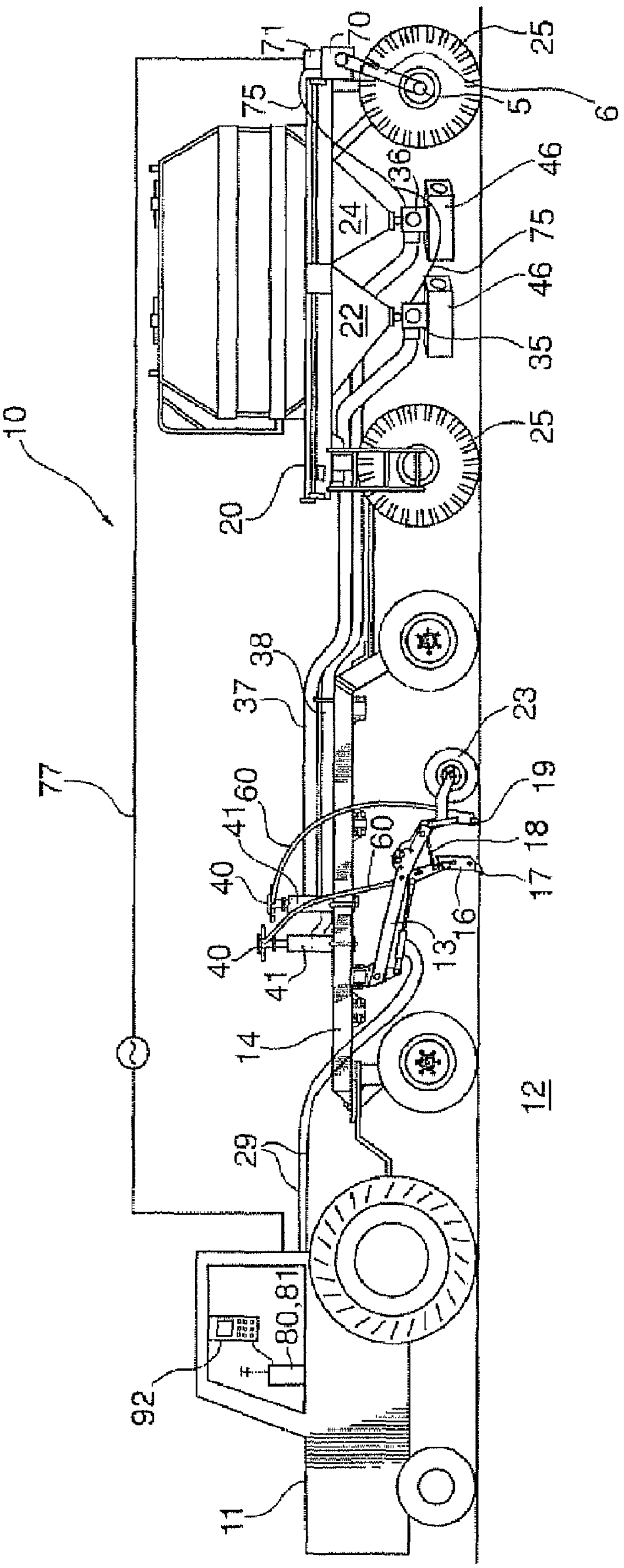
FIG. 1 is a side view of a first embodiment of the air seeder/fertilizer apparatus of the present invention towed behind a tractor comprising two parts, the first part of the apparatus comprising a tool bar having a number of independently raisable soil-engaging members, behind which is towed a second part namely a seed/fertilizer containment cart.

The present invention, both as to its organization and manner of operation, may best be understood by reference to the following description and the drawings. Certain parts which are mentioned may be absent in particular figures due to the view of the drawing or obstruction by other parts.

FIG. 1 is a semi-schematic illustration showing a particular embodiment of the air seeder/fertilizer implement or device 10 of the present invention for injecting seed and fertilizer into soil 12.

In the particular embodiment shown in FIG. 1, air seeder/fertilizer apparatus 10 is comprised of two sub-assemblies. A first sub-assembly comprises a "tool bar" component 14 which is towed by a towing vehicle such as a tractor 11. Tool bar 14 has a number of pivotable arm members 13 mounted thereon (only one shown), each pivotable arm member 13 having soil engaging members 16, 18 thereon, namely a fertilizer knife 17 and a seed knife 19 for creating a fertilizer furrow and a seed furrow respectively in soil 12, to permit injection of fertilizer and seed in such soil 12. A second sub-assembly comprises a seed/fertilizer cart 20, which comprises a seed bin 22 and a fertilizer bin 24, which is typically attached rearward of and towed behind tool bar 14. Cart 20 generally possesses large wide wheels/tires 25 to disperse the weight of cart 20 over the ground to avoid the wheels sinking into soil 12 under the weight of seed and fertilizer contained in bins 22 and 24 respectively.

Figure 2:
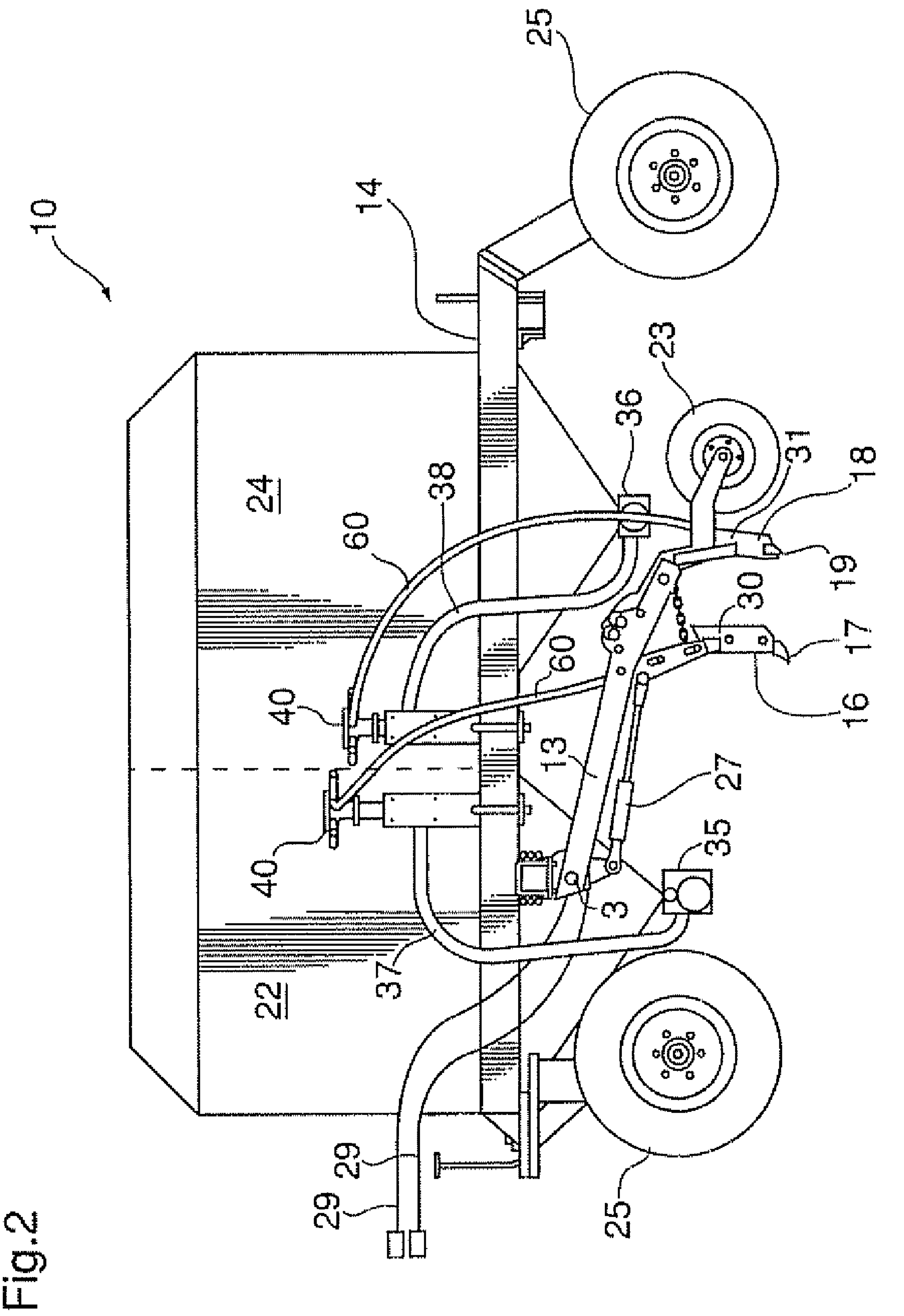
FIG. 2 is a side view of a second embodiment of the air seeder/fertilizer apparatus of the present invention, wherein both the tool bar section and containment cart are combined into a single apparatus.

In an alternative embodiment of the present invention shown in FIG. 2, the air seeder/fertilizer apparatus 10 of the present invention consists only of the tool bar 14 without a separate cart 20—the seed bin 22 and the fertilizer bin 24 being mounted on the tool bar 14 thereby dispensing with the need for a separate cart 20.

Figure 3:
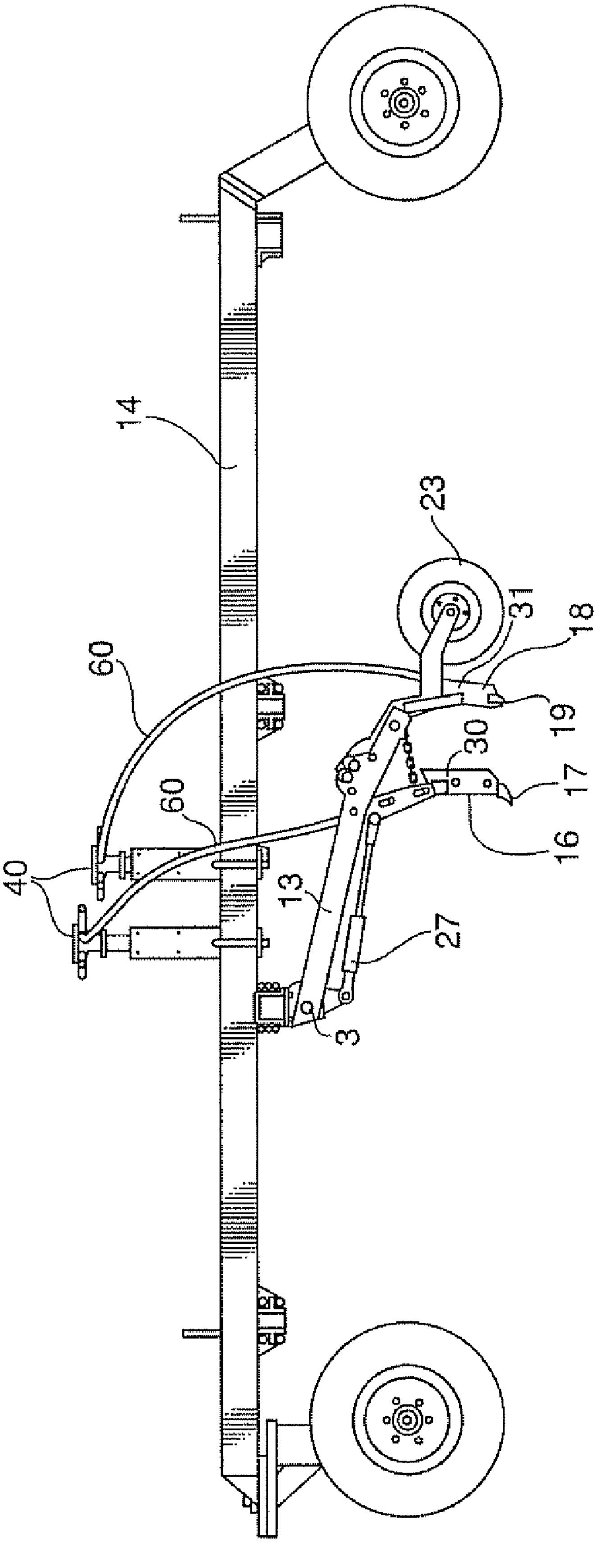
FIG. 3 is a side view of the tool bar section of the apparatus of FIG. 1, showing in greater detail a particular soil-engaging member thereon, wherein the soil-engaging member is shown in the lowered (ie operative) position.
Figure 4:
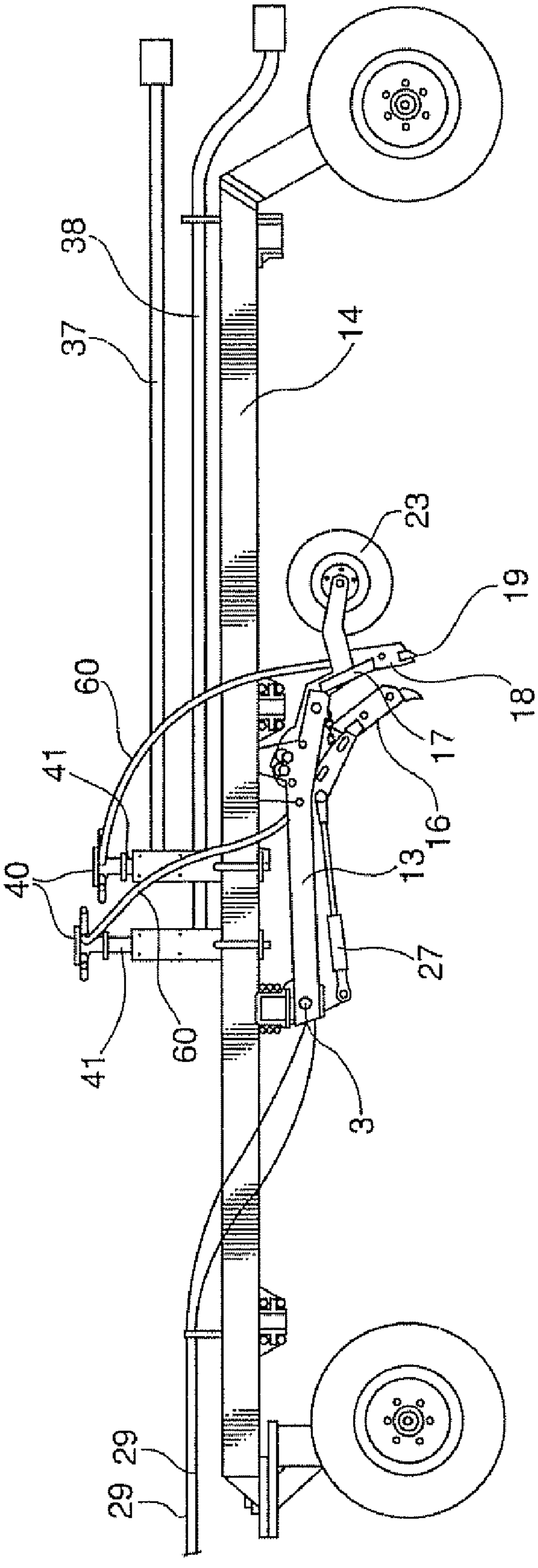
FIG. 4 is a side view of the tool bar section of the apparatus similar to FIG. 3, but where the soil-engaging member is shown in the raised (ie inoperative) position.

In all embodiments, pivotable arm members 13 are pivotable from a lowered operative position, as seen in FIGS. 1, 2 & 3 wherein the soil engaging members 16, 18, namely the fertilizer knife 17 and seed knife 19, each engage soil 12 and packer wheel 23 contacts soil 12 and packs soil 12 over created furrows in soil 12 which have had seed and fertilizer inserted therein by apparatus 10, to a raised inoperative position as best seen in FIG. 4. Specifically, raising means in the form of a double-acting hydraulically-actuated cylinder 27 associated with each pivotable arm member 13 may be actuated (as explained further herein) so as to extend thereby forcing pivotable arm member 13 to rotate about a point of pivotable coupling 3 to tool bar 14, so as to cause raising of pivotable arm member 13, thereby raising the soil engaging members 16,18 and packer wheel 23 from contacting and engaging soil 12. Hydraulic cylinder 27 receives a source of hydraulic pressure via hydraulic lines 29, operatively coupled to a hydraulic system provided by the towing vehicle 11.

As seen in each of FIGS. 1-4, each of soil engaging members 16, 18, namely fertilizer knife 17 and seed knife 19, have an associated material-dispensing means thereon in the form of a hollow tube member 30, 31 respectively, for delivering particulate material in the form of fertilizer and seed to respective furrows in soil 12 created by the fertilizer knife 17 and seed knife 19.

Situated immediately beneath seed bin 22 and fertilizer bin 24 are metering devices 35, 36, respectively, which may be similar (except with modifications as explained below to make such meter device 35, 36 meter particulate material proportional to the number of open solenoid valve means 44 on distributor manifold 40) to meter devices commercially now available, such as the meter devices manufactured by Flexi-coil Inc. or Morris Industries Inc, each of which utilize a rotating fluted roller which is gravity fed from a seed bin 22 or fertilizer bin 24 to dispense seed to dispense/meter the seed or fertilizer. Alternatively the meter devices 35, 36 of the present invention may be similar to those made by New Noble Services Inc. which use a helical auger, or particular models made by Deere & Company which use a toothed distribution wheel as described in U.S. Pat. No. 5,784,985.

Like certain of the meter devices manufactured by Flexi-Coil Inc. or Morris Industries Inc., meter devices 35, 36 of the present invention have means to allow the metering of the seed or fertilizer to be proportional to the speed of the apparatus over the ground. Specifically, means are provided to ensure that the meter roller (not shown) or meter dispensing wheel (not shown) or helical auger (not shown) in meter devices 35,36 turns directly proportional to the speed of the apparatus over the ground.

This may be accomplished in a number of ways.

In a first (illustrated) way as shown in FIG. 1, an electric generator 70 is operatively coupled via a chain drive belt 6 to a geared sprocket 5 on an axle (not shown) of the implement 10. A control means 71 receives electrical signal proportional to the speed of the implement 10 from the generator 70, and modulates electrical power 77 from the towing vehicle 11 to an electric motor (not shown) contained in such metering device 35,36 via lines 75, so that the rotational speed of the electric motor in metering device 35,36 which drives a metering roller, metering distribution wheel, or helical auger in such metering device 35, 36, is directly proportional to the speed of the implement 10 over the ground. Control means 71 can also be used to regulate/modulate electrical power from towing vehicle 11 to metering device 35,36 in proportion to the number of solenoid valves 44 on distribution manifold 40 (see below) which remain open, in order to meter the seed and fertilizer from bins 22, 24 also in proportion to the number of open outlet ports from distribution manifold 40 which are supplying metered particulate material to material dispensing means, namely tubes 31, 32 during seeding operation.

Alternatively, in a more preferred manner for rendering the metering device capable of dispensing at a rate proportional to the speed of the implement 10, instead of sensing the speed of the implement 10 over the ground by an electric generator 70 coupled to a ground drive, the speed of the implement 10 over the ground may be sensed by satellite navigation system 80, typically a GPS, GNSS, or Gallileo based satellite navigation system, or alternatively by a radar or sonar means (not shown). Using such determined implement speed, control means 71 can then be used to control electrical power 77 from the towing vehicle/tractor 11 to an electric motor (not shown) located in such metering device 35, 36 which is delivered via electrical lines 75, to thereby render the metering rate of metering device 35, 36 proportion to the speed of the implement 10.

In a second alternative way, a hydraulic motor 70 is operatively coupled via a chain drive belt 6 to a geared sprocket 5 on an axle (not shown) of the implement 10. Hydraulic output therefrom, via hydraulic connecting line 75, is operatively coupled to a similar hydraulic motor (not shown) located in each of metering devices 35, 36, so as to thereby cause regulation of the rotational speed of a metering roller, metering distribution wheel, or alternatively a helical auger located in such metering device 35, 36 proportional to the speed of the implement 10 over the ground. In a refinement of such configuration, hydraulic output from hydraulic motor 70 may instead be provided to a control means 71, which control means regulates electrical power 77 provided to an electric motor contained in such metering devices 35, 36 via electrical lines 75, to thereby control the metering of the metering device in proportion to the speed of the implement 10.

Lastly, in a third configuration (not shown), each of metering devices 35, 36 may be directly coupled via a gear, drive belt or the like which is rotated by one of wheels 25 of implement 10 as such wheel travels over soil 12. Metering device 35,35 is directly driven, but is of a type which contains an electrically-actuated arm which variably connects different gears contained in such metering device, much like a speed-selectable transmission, to select a desired gear ratio to dispense and meter particulate material at a desired dispensing rate proportional to the speed of the implement 10 over the ground and the number of open outlet ports 42. One such prior art metering device suited to such an application as herein contemplated is the electrically-actuated variable gear metering device 1,2 as shown in CA 2,311,698 to Bourgault Industries Inc., which describes (at page 14, lines 16-24) microprocessor-controlled metering devices 1,2, which have first and second electric actuators 15A, 16A which are operable remotely from the tractor 29 to allow remote changing of the applicator ratios for different seed and fertilizer types, while simultaneously allowing the rate of application to be proportional to the speed of the implement 10 over the ground as sensed by a speed sensing means. A similar electrically-actuated variable speed metering device which could be adapted for use in the manner described herein to allow metering of particulate material proportional to both the rate of speed of the implement 10 and the number of outlet ports 42 which are in an open condition (see below) is the variable drive metering device described in U.S. Pat. No. 4,122,974 to Deere & Company. Other similar variably-selectable drive metering devices 35, 36 which may be adapted for the purposes of metering particulate flow are ZERO-MAX™ brand metering devices made by Zero-Max Inc.[2] of North Plymouth, Minn., U.S.A.

[2] ZERO-MAX is a trade mark of Zero-Max, Inc for variable transmission seed metering devices.

Alternative refinements and permutations of the above configurations for making the metering devices 35, 36 meter particulate material at a rate proportional to the speed of the implement 10 will now be clearly apparent and occur to persons of skill in the art.

In the present invention, meter devices 35, 36 deliver metered particulate material (seed from bin 22 and fertilizer from bin 24) firstly via respective conduits 37, 38 which are each injected with an air flow via a respective air blower 46 to a respective distribution manifold 40 typically mounted on tool bar 14, and thereafter subsequently delivered via air flowing in pneumatic delivery lines 60 to the respective material dispensing means (ie hollow tube members 30 or 31) mounted on respectively fertilizer knife 17 and seed knife 19, as shown in FIGS. 1-4.

Figure 5:
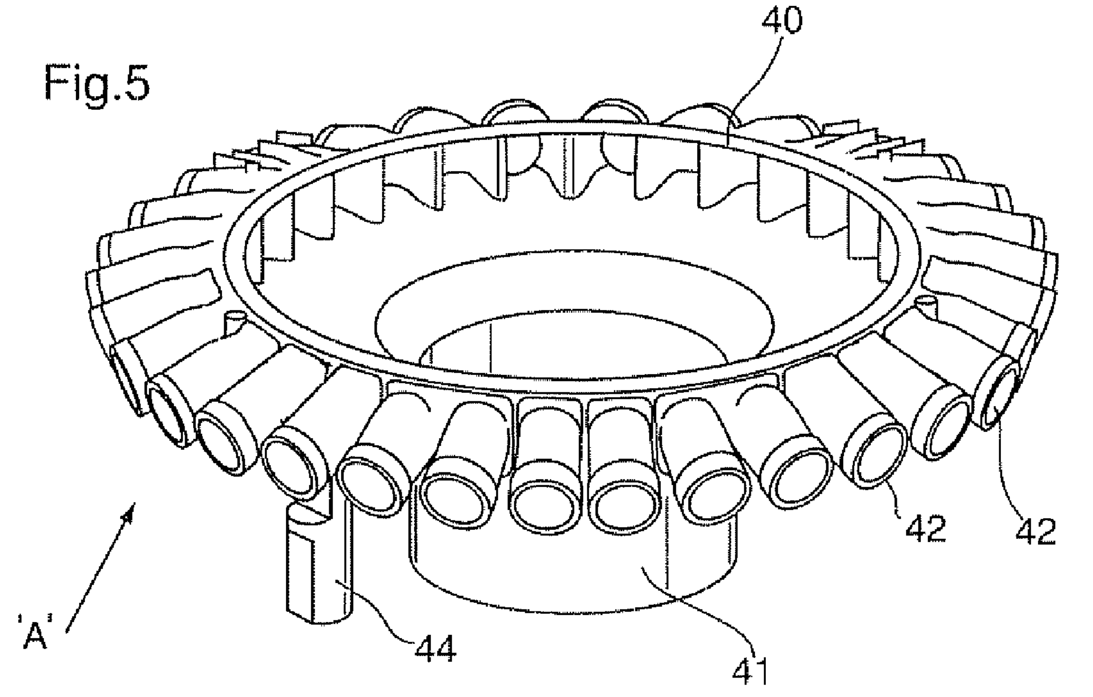
FIG. 5 is a top perspective (partially cut-away) view of the distribution manifold of the present invention, showing, for purposes of clarity, only one of the solenoid valve means (gates) installed on an associated outlet port of such manifold.
Figure 6:
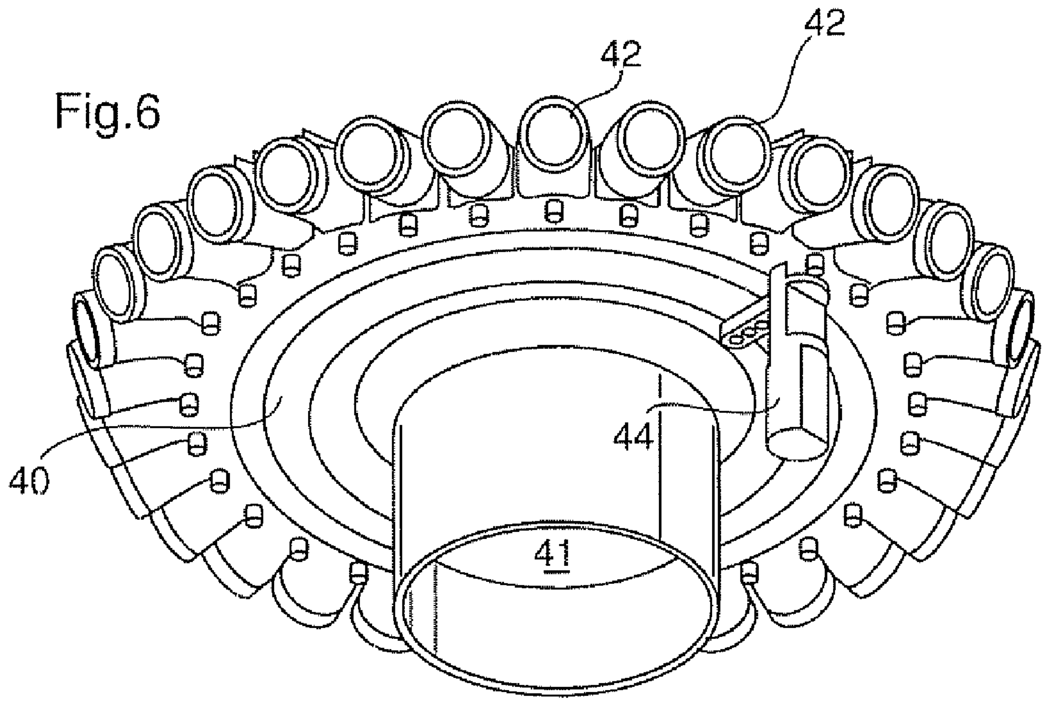
FIG. 6 is a view taken along arrow "A" of FIG. 5.

In a preferred embodiment, the distribution manifold 40, as shown in greater detail in FIGS. 5 & 6, comprises a cylindrical apparatus, having a centrally-located inlet port 41 for receiving metered particulate material, and a plurality of outlet ports 42 arranged about an outer periphery 43 thereof. A plurality of electrically-operated solenoid valves 44 (only one being shown for purposes of clarity in FIGS. 5 & 6) are provided in association with each of said plurality of outlet ports 42, each solenoid valve 44 having an extending/retracting rod member (not shown) affixed to a gate member (not shown), in order to permit slidable movement of such gate member within each of said outlet ports 42 to permit selected opening and closing of individual outlet ports 42.

A typical solenoid operated valve 44 for use in the manner contemplated in the present invention is one such valve, rod, and gate means solenoid valve assembly manufactured by Vaderstad Verken AB of Sweden.

Figure 7:
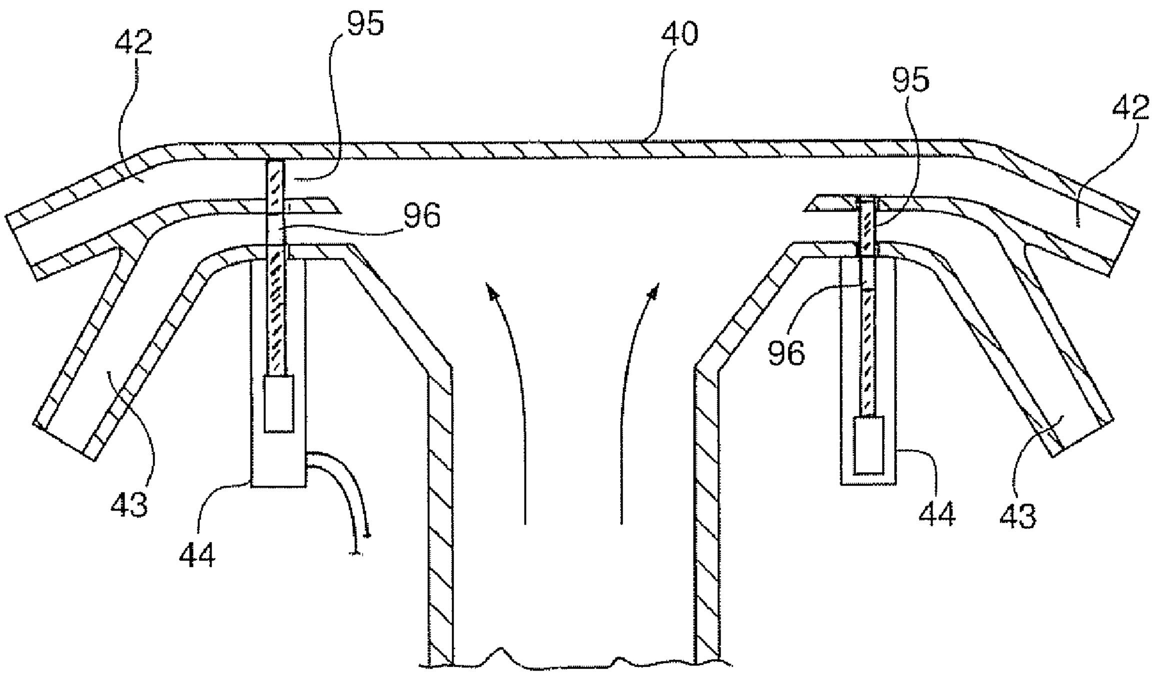
FIG. 7 is a cross-sectional view of an alternative embodiment of the distribution manifold of the present invention, having a "Y" return port branching of the outlet ports thereon.

In an alternative embodiment of distribution manifold 40 of the present invention as shown in FIG. 7, specifically as seen in a cross-section through such alternative configuration of the distribution manifold 40, at each outlet port 42 thereon a return port 43 is situated. Solenoid valve 44 has a vertically-slidable plate member 95, which in the extended position shown on the left-hand side of FIG. 7, serves to close outlet port 42 and at the same time simultaneously open return port 43 by means of an aperture 96 in plate member 95. When vertically-slidable plate member 95 of solenoid valve 44 is moved by solenoid valve 44 to a retracted position, as shown on the right-hand side of FIG. 7, outlet port 42 is opened to allow egress of metered particulate matter from distribution manifold 40, while at the same time return port 43 is closed by plate member 45 so as to prevent egress of particulate matter from return port 43 back to seed bin 22 or fertilizer bin 24, as the case may be.

Importantly, meter devices 35, 36 are adapted, in the various manners set out above, to meter the particulate material (seed, fertilizer) delivered to distribution manifold 40 in proportion not only to the speed of the implement 10 over the ground, but also in proportion to the number of outlet ports 42 which are in an open condition as regulated by solenoid valves 44. However, in the alternative embodiment of the implement 10 having the modified distribution manifold as shown in FIG. 7, with return ports 43, it is only necessary in such configuration that the meter devices 35, 36 meter proportionately in response to vehicle speed, and need not in such configuration meter proportional to the number of outlet ports which are open, as in such configuration all excess supply not being used to ports being closed is returned to one of bins 22 or 24.

Agricultural implement 10 is further provided with navigational equipment, typically a satellite navigation means 80 using GPS (Global Positioning System), GNSS (Global Navigation Satellite System), or Gallileo satellite-based navigation systems, which provides precise geographic position of said agricultural implement 10 at a given point in time.

Memory means 81 as typically included in GPS satellite navigation means 80 is also provided for keeping a record of such precise geographic position of implement 10 over time as it travels over the ground. In a preferred embodiment, such satellite navigation means 80 and memory means 81 may be used to determine speed of implement 10, for regulating the metering devices 35, 36 in the manner described above.

Associated determination and actuation means 92 are provided in conjunction with satellite navigation means 80, for determining whether portions of implement 10 have previously travelled over ground over which implement 10 may then be travelling. One such determination means suitable for adaptation as a component in the inventive agricultural implement set out herein and for the inventive uses described herein is the ACCU-BOOM™[3] device manufactured by Raven Industries Inc, of Sioux Fall, S.D., which is used for shutting off supply of liquid to spray boom arms on agricultural sprayers.

[3] Trademark of Raven Industries Inc. of Sioux Falls, S.D., for GPS agricultural control units for agricultural equipment If it is determined by determination means 92 that implement 10, or a portion of implement 10, has travelled previously over a portion of ground when seeding/fertilizing supply was operative (ie soil engaging members were in operating and soil-engaging position), then in such case determination and actuation means 92 is further adapted to simultaneously send a signal to:

(i) an electrically-controlled solenoid (not shown), which solenoid will when actuated allow flow of hydraulic fluid from tow vehicle 11 to be provided to selected hydraulic raising cylinders 27 to associated material-dispensing means 30, 31, associated seed knives 17, and fertilizer knives 19 which otherwise would engage soil 12 over which implement 10 had previously travelled so as to cause associated pivotable arm members 13 to move to a raised position and be raised from the ground; and (ii) selected of solenoid valves 44 on distribution manifold 40 to cause the selected solenoid valves 44 to close thereby preventing delivery of particulate material from metering means 35,36 to material-dispensing means 30, 31 on associated selected pivotable arm members 13 which have been raised to the inoperative position as described in step (i) above and as shown in FIG. 4 herein, so as to thereby prevent areas of ground in which particulate material has already been injected from being further re-injected with particulate material, and from disturbing already-seeded seed beds.

It should be recognized that while preferred embodiments of the present invention have been described, those skilled in the art will recognize a wide variation of structural and operational details without departing from the principals of the invention. Accordingly, for a full definition of the invention, reference is to be had to the claims.

I claim:

1. An agricultural implement for injecting at least one type of particulate material namely seed, fertilizer, or inoculant into soil, adapted to travel over an area of ground having both seeded portions which have had said particulate material injected therein and unseeded portions of ground which have not had said particulate material injected therein, and to inject said particulate material only into said unseeded portions of ground, comprising;

a plurality of soil-engaging members and associated raising means, each raising means when actuated adapted to raise an associated soil-engaging member from a lowered operating position where said soil-engaging member engages soil to a raised inoperative position;

a plurality of material-dispensing means for receiving said particulate material and dispensing said particulate material into furrows created by said soil-engaging members;

a metering means for dispensing said particulate material at a metered rate;

a distribution manifold, having:

(i) an inlet port for receiving metered particulate material from said metering means;

(ii) a plurality of outlet ports, and (iii) valve means on each of said plurality of outlet ports to permit selected opening and closing of said plurality of outlet ports;

said metering means dispensing said particulate material to said distribution manifold at said metered rate proportional to a rate of travel of said implement over the ground.

2. An agricultural implement as claimed in claim 1, wherein said metering means dispenses said particulate material to said distribution manifold at said metered rate both proportional to a rate of travel of said implement over the ground and inversely proportional to a number of outlet ports on said distribution manifold which have been selectively closed by said valve means.

3. An agricultural implement as claimed in claim 1, further comprising:

navigation means for providing precise geographic position of said agricultural implement at given points in time memory means for keeping a record of said precise geographic position over time as said agricultural implement travels over the ground; and determination and actuation means for determining whether portions of said agricultural apparatus have previously travelled over ground over which said agricultural implement may then be travelling, and if determining such to be the case, further adapted to actuate selected of said raising means and associated soil-engaging means which otherwise would engage soil in ground over which said agricultural implement had previously travelled so as to cause said selected soil-engaging members to become raised from said ground, thereby preventing areas of ground in which particulate material has already been injected from being further re-injected with particulate material.

4. An agricultural implement as claimed in claim 1 further comprising:

navigation means for providing precise geographic position of said agricultural implement at a given point in time;

memory means for keeping a record of said precise geographic position over time as said agricultural implement travels over the ground; and determination and actuation means for determining whether portions of said agricultural apparatus have previously travelled over ground over which said agricultural implement may then be travelling, and if determining such to be the case, further adapted to actuate selected of said valve means on said distribution manifold to cause said selected valve means to close to thereby prevent delivery of said particulate material from said metering means to said selected material-dispensing means, thereby preventing areas of ground in which particulate material has already been injected from being further re-injected with particulate material.

5. An agricultural implement as claimed in claim 1 further comprising:

satellite navigation means for providing precise geographic position of said agricultural implement at a given point in time;

memory means for keeping a record of said precise geographic position over time as said agricultural implement travels over the ground; and determination and actuation means for determining whether portions of said agricultural apparatus have previously travelled over ground over which said agricultural implement may then be travelling, and if determining such to be the case, further adapted to actuate selected of said raising means and associated material-dispensing means and soil-engaging means which otherwise would engage soil in ground over which said agricultural implement had previously travelled so as to cause said selected soil-engaging members to become raised from said ground, and to simultaneously actuate selected of said valve means on said distribution manifold to cause said selected valve means to close to thereby prevent delivery of said particulate material from said metering means to said selected material-dispensing means, thereby preventing areas of ground in which particulate material has already been injected from being further re-injected with particulate material.

6. The agricultural implement as claimed in claim 1, wherein said metering means is in communication with a speed-sensing means so that said metering means dispenses said particulate material at said metered rate proportional to a speed at which said implement travels over the ground.

7. The agricultural implement as claimed in claim 6, wherein said metering means comprises a metering roller, a helical auger, or a distribution wheel, which roller, helical auger, or distribution wheel is operatively turned by an electric motor, hydraulic motor, or direct drive from a wheel of such implement when such implement travels over ground, wherein a rotational speed of said metering roller, helical auger, or distribution wheel is proportional to the speed of travel of the agricultural implement over the ground.

8. The implement as claimed in claim 1, wherein said distribution manifold , at each of such outlet ports, having a return port; and said valve means, when actuated to close a selected outlet port simultaneously opens an associated return port, to permit return of particulate material to a supply bin via said return port.

9. An agricultural implement for injecting particulate material namely seed, fertilizer, or inoculant into soil, towable behind a vehicle such as a tractor, comprising:

a wheeled cart having at least one containment bin mounted thereon for containing said particulate material;

a tool bar adapted to be operatively coupled to said wheeled cart, comprising a plurality of elongate mounting arms mounted thereto, each mounting arm adapted to be moved from a raised transport position to a lowered operating position, soil engaging means mounted on each of said mounting arms, adapted to engage soil when each of said mounting arms is in said lowered operating position;

material-dispensing means on each of said mounting arms, proximate said soil engaging means, for dispensing said particulate material into the soil;

a distribution manifold, having:

(i) an inlet port for centrally receiving therein metered particulate material;

(ii) a plurality of outlet ports, arranged about a circular periphery of said manifold., each in fluid communication with a corresponding one or more of said material-dispensing means; and (iii) valve means on each of said plurality of outlet ports to permit selected opening and closing of said plurality of outlet ports;

metering means adapted to distribute said particulate material to said inlet port of said distribution manifold at a metered rate, said metered rate proportional to both a rate of travel of said implement over the ground and a number of outlet ports on said distribution manifold which have been selectively opened.

10. An agricultural implement as claimed in claim 9, further comprising:

navigation means for providing precise geographic position of said agricultural implement at given points in time;

memory means for keeping a record of said precise geographic position over time as said agricultural implement travels over the ground; and determination and actuation means for determining whether portions of said agricultural apparatus have previously travelled over ground over which said agricultural implement may then be travelling, and if determining such to be the case, further adapted to actuate selected of said raising means and associated soil-engaging means which otherwise would engage soil in ground over which said agricultural implement had previously travelled so as to cause said selected soil-engaging members to become raised from said ground, thereby preventing areas of ground in which particulate material has already been injected from being further re-injected with particulate material.

11. An agricultural implement as claimed in claim 9, further comprising:

navigation means for providing precise geographic position of said agricultural implement at a given point in time;

memory means for keeping a record of said precise geographic position over time as said agricultural implement travels over the ground; and determination and actuation means for determining whether portions of said agricultural apparatus have previously travelled over ground over which said agricultural implement may then be travelling, and if determining such to be the case, further adapted to actuate selected of said valve means on said distribution manifold to cause said selected valve means to close to thereby prevent delivery of said particulate material from said metering means to said selected material-dispensing means, thereby preventing areas of ground in which particulate material has already been injected from being further re-injected with particulate material.

12. An agricultural implement as claimed in claim 9, further comprising:

satellite navigation means for providing precise geographic position of said agricultural implement at a given point in time;

memory means for keeping a record of said precise geographic position over time as said agricultural implement travels over the ground; and determination and actuation means for determining whether portions of said agricultural apparatus have previously travelled over ground over which said agricultural implement may then be travelling, and if determining such to be the case, further adapted to actuate selected of said raising means and associated material-dispensing means and soil-engaging means which otherwise would engage soil in ground over which said agricultural implement had previously travelled so as to cause said selected soil-engaging members to become raised from said ground, and to simultaneously actuate selected of said valve means on said distribution manifold to cause said selected valve means to close to thereby prevent delivery of said particulate material from said metering means to said selected material-dispensing means, thereby preventing areas of ground in which particulate material has already been injected from being further re-injected with particulate material.

13. The agricultural implement as claimed in claim 9, wherein said metering means is in communication with a speed-sensing means so that said metering means dispenses said particulate material at said metered rate proportional to a speed at which said implement travels over the ground.

14. The agricultural implement as claimed in claim 13, wherein said metering means comprises a metering roller, a helical auger, or a distribution wheel, which roller, helical auger, or distribution wheel is operatively turned by an electric motor, hydraulic motor, or direct drive from a wheel of such implement when such implement travels over ground, wherein a rotational speed of said metering roller, helical auger, or distribution wheel is proportional to the speed of travel of the agricultural implement over the ground.

15. The agricultural implement as claimed in claim 9, wherein each of said valve means is selected from the group of valve means comprising an electrically-actuated valve means, a hydraulically-actuated valve means, or an electric-over-hydraulic valve means.

16. The agricultural implement as claimed in claim 9, wherein all or some of said valve means are controlled by an operator in a cab of said vehicle.

17. An agricultural implement for injecting particulate material namely seed, fertilizer, or inoculant into soil, towable behind a vehicle such as a tractor, comprising:

a central frame;

at least one containment bin mounted on such central frame, for containing said particulate material;

a plurality of elongate mounting arms mounted to said central frame, each mounting arm adapted to be moved from a raised transport position to a lowered operating position, soil engaging means mounted on each of said mounting arms, adapted to engage soil when each of said mounting arms is in said lowered operating position;

material-dispensing means on each of said mounting arms, proximate said soil engaging means, for dispensing said particulate material into the soil;

a distribution manifold, having:

(i) an inlet port for receiving metered particulate material;

(ii) a plurality of outlet ports, each in fluid communication with at least one material-dispensing means on said soil-engaging members; and (iii) valve means on each of said plurality of outlet ports to permit selected opening and closing of said plurality of outlet ports;

metering means adapted to distribute said particulate material to said inlet port of said distribution manifold at a metered rate, said metered rate proportional to both a rate of travel of said implement over the ground and a number of outlet ports on said distribution manifold which have been selectively opened.

18. The agricultural implement as claimed in claim 17, further comprising:

navigation means for providing precise geographic position of said agricultural implement at a given point in time;

memory means for keeping a record of said precise geographic position over time as said agricultural implement travels over the ground; and determination and actuation means for determining whether portions of said agricultural apparatus have previously travelled over ground over which said agricultural implement may then be travelling, and if determining such to be the case, further adapted to actuate selected of said raising means and associated material-dispensing means and soil-engaging means which otherwise would engage soil in ground over which said agricultural implement had previously travelled so as to cause said selected soil-engaging members to become raised from said ground, and to simultaneously actuate selected of said valve means on said distribution manifold to cause said selected valve means to close to thereby prevent delivery of said particulate material from said metering means to said selected material-dispensing means, thereby preventing areas of ground in which particulate material has already been injected from being further re-injected with particulate material.

19. The implement as claimed in claim 18, wherein said metering means comprises a metering roller, a helical auger, or a distribution wheel, which roller, helical auger, or distribution wheel is operatively turned by an electric motor, hydraulic motor, or direct drive from a wheel of such implement when such implement travels over ground, wherein a rotational speed of said metering roller, helical auger, or distribution wheel is proportional to the speed of travel of the agricultural implement over the ground.

* * * * *